(12) United States Patent
Simpson Alvarez (10) Patent No.: US 10,480,086 B2
(45) Date of Patent: Nov. 19, 2019

(54) MULTIPURPOSE ELECTROLYTIC DEVICE (MPED) FOR FORCED OR SPONTANEOUS ELECTROLYTIC PROCESSES, WITH INDEPENDENT ELECTROLYTES

(71) Applicant: Jaime Roberto Simpson Alvarez, Santiago (CL)

(72) Inventor: Jaime Roberto Simpson Alvarez, Santiago (CL)

(73) Assignee: PROTECH SPA, Santiago (CL)

( * ) Notice: Subject to any disclaimer, the term of this patent is extended or adjusted under 35 U.S.C. 154(b) by 173 days.

(21) Appl. No.: 15/525,778

(22) PCT Filed: Nov. 23, 2015

(86) PCT No.: PCT/CL2015/050044
§ 371 (c)(1),
(2) Date: May 10, 2017

(87) PCT Pub. No.: WO2016/074107
PCT Pub. Date: May 19, 2016

(65) Prior Publication Data
US 2018/0327915 A1    Nov. 15, 2018

(30) Foreign Application Priority Data
Nov. 10, 2014    (CL) .................................. 3049-2014

(51) Int. Cl.
*C25B 9/02*    (2006.01)
*C25C 1/00*    (2006.01)
(Continued)

(52) U.S. Cl.
CPC .................. *C25B 9/02* (2013.01); *C25B 9/08* (2013.01); *C25B 9/10* (2013.01); *C25B 15/08* (2013.01);
(Continued)

(58) Field of Classification Search
None
See application file for complete search history.

(56) References Cited

U.S. PATENT DOCUMENTS 3,959,111 A * 5/1976 Mardine .................... C25C 7/00
204/258
4,141,804 A * 2/1979 Avedesian ................ C25C 1/00
204/277
(Continued)

FOREIGN PATENT DOCUMENTS

GB          1422298 A     1/1976
JP        09-263984 A    10/1997
WO      2011/026253 A1    3/2011

OTHER PUBLICATIONS

International Search Report dated Feb. 16, 2016; PCT/CL2015/050044.

*Primary Examiner* — Harry D Wilkins, III (57) ABSTRACT

Multipurpose electrolytic device (EMPD) for forced or spontaneous electrolytic processes, which incorporates selective and unidirectional ion exchange membranes in order to separate between two or more compartments and allow electrical conductivity therebetween, with independent electrolytes for controlled electrolytic ion transformation, regardless of the chemical composition of the electrolyte containing the element of interest, with high faradaic efficiency and high energy performance. The invention also relates to a method. The device can be used for processes such as metal electrowinning (EW), metal electrorefining, electrooxidation (EOXI) and electroreduction (ERED) of ionic species. The device uses two independent, energetically suitable electrolytes, which allow controlled electrolytic ion transformation, with high faradaic efficiency and high energy performance, unlike current forced electrolysis methods, which operate with a common electrolyte. The (Continued)

device can be used in any aqueous medium, for example an acid environment, such as sulphuric, hydrochloric or other acid, a caustic-soda-based alkaline, or ammonium, thiocyanate or thiosulfate salts, with or without the presence of organic reactants.

6 Claims, 3 Drawing Sheets

(51) Int. Cl.
| | | |
|---|---|---|
| *C25C 7/00* | (2006.01) | |
| *C25D 17/12* | (2006.01) | |
| *C25B 9/08* | (2006.01) | |
| *C25B 9/10* | (2006.01) | |
| *C25C 7/04* | (2006.01) | |
| *C25B 15/08* | (2006.01) | |
| *H01M 8/18* | (2006.01) | |
| *C25D 17/02* | (2006.01) | |
| *C25D 21/18* | (2006.01) | |
| *H01M 8/08* | (2016.01) | |

(52) U.S. Cl.
CPC .................. *C25C 1/00* (2013.01); *C25C 7/00* (2013.01); *C25C 7/04* (2013.01); *C25D 17/12* (2013.01); *H01M 8/188* (2013.01); *C25D 17/02* (2013.01); *C25D 21/18* (2013.01); *H01M 8/08* (2013.01); *Y02P 10/234* (2015.11)

(56) References Cited

U.S. PATENT DOCUMENTS

| | | | |
|---|---|---|---|
| 4,948,476 A | 8/1990 | Kamperman et al. | |
| 5,194,132 A * | 3/1993 | Hartmann | C25B 9/08 |
| | | | 204/257 |
| 5,344,540 A * | 9/1994 | Heinke | C02F 1/46104 |
| | | | 204/232 |
| 2003/0155232 A1* | 8/2003 | Katayama | C25B 9/20 |
| | | | 204/252 |
| 2006/0219574 A1 | 10/2006 | Rahman et al. | |
| 2016/0115609 A1* | 4/2016 | Barker | C25C 1/12 |
| | | | 205/771 |
| 2016/0201203 A1* | 7/2016 | Asada | C25B 15/08 |
| | | | 205/351 |

* cited by examiner

MULTIPURPOSE ELECTROLYTIC DEVICE (MPED) FOR FORCED OR SPONTANEOUS ELECTROLYTIC PROCESSES, WITH INDEPENDENT ELECTROLYTES

FIELD OF APPLICATION

The present invention discloses a multipurpose electrolytic device (MPED) for forced or spontaneous electrolytic processes, which incorporates selective and unidirectional ion exchange membranes in order to separate two or more compartments and allow electrical conductivity therebetween, with independent electrolytes for controlled electrolytic ion transformation, regardless of the chemical composition of the electrolyte containing the element of interest, with high faradaic efficiency and high energy performance. The invention also relates to a method. The device is applicable to processes such as metal electrowinning (EW), metal electrorefining, electrooxidation (EOXI) and electroreduction (ERED) of ionic species. The device uses two independent electrolytes, suitably selected from an energy standpoint, which allow controlled electrolytic ion transformation, with high faradaic current efficiency and high energy performance, unlike current forced electrolysis methods, which operate with a common electrolyte.

The device can be used in any aqueous medium, for example an acid environment, such as sulphuric, hydrochloric or other acid, a caustic-soda-based alkaline, or ammonium, thiocyanate or thiosulfate salts, with or without the presence of organic reactants.

The (MPED) is comprised of two or more compartments which have electricity-conducting electrolytes with insoluble conducting or semiconducting electrodes immersed in said electrolyte and, in the case of forced processes, electrically connected to an external direct current supply source (EDCS) and in case of spontaneous processes, which do not require a supply source but constitute a battery capable of generating electric energy available for consumption. For both forced and spontaneous processes, two adjacent electrodes always have different electric polarity, the compartments separated from each other by an ion exchange membrane (IEM) allowing selective and unidirectional transfer of ions, consistent with the direction of the either applied or spontaneously generated electrical field between the conducting or semiconducting electrodes of two adjacent compartments, which depends on the type of ionic exchange membrane used by the (MPED), namely anionic (AIEM) or cationic (CIEM). This selective flow through the ion exchange membrane (IEM) allows the electrical conductivity between two adjacent compartments.

PRIOR ART

Forced or spontaneous electrolytic processes are produced by oxide-reduction (redox) reactions involving transfer of electrons from one species to another.

Spontaneous processes or galvanic cells are those in which the transfer of electrons occurs naturally when two semi-cells of different electric potential are brought into contact. In these cases, the oxidation of a species occurs in a semi-cell, releasing electrons from the anode to the cathode, wherein a species is reduced in the other half-cell. When the semi-cells used correspond to irreversible reactions, they are called cells and when the reactions involved are reversible they are called batteries and its most common field of application is the generation of direct current.

Cells involving irreversible reactions are known as primary cells and correspond to disposable batteries used in electronic devices, whereas batteries are those called secondary accumulator cells that can be reused, such as car batteries or the current ones of cell phones.

An old process, although in disuse nowadays, is the primary cell formed between iron scrap and copper solutions, a process known as cementation, in which the following semi-cell reactions are produced:

Cathodic Reaction:

$$Cu^{2+} + 2e^- = Cu \quad (1)$$

Anodic Reaction:

$$Fe = Fe^{2+} + 2e^- \quad (2)$$

Forming the Global Reaction:

$$Fe + Cu^{2+} = Fe^{2+} Cu \quad (3)$$

That is, if you have a copper-rich solution and it is brought into contact with iron scrap, the iron dissolves in the form of $Fe^{2+}$ and the copper, which was initially in solution as $Cu^{2+}$, precipitates as metallic copper. This reaction occurs spontaneously and allows total precipitation of copper if the iron scrap is sufficient. Like this process there is the cementation of gold with zinc (Merryl-Crowe process) and others.

The problem of the metal cementation technique is that it does not take advantage of the electric energy that is produced because the same electrolyte is shared and because the metallic precipitate precipitates on the surface of the iron that is dissolving, that is to say the iron scrap constitutes the cell itself, in which a cationic zone and an anionic zone can be identified, which is the bridge where the metal transfer takes place.

Forced processes are those in which the redox reaction occurs if and only if external energy is applied to produce the transfer of electrons. An important application occurs in the metal electrowinning processes, in which an electric potential difference is applied between two electrodes immersed in an electrolyte, thus forcing the occurrence of an anodic reaction, usually the electrolytic decomposition of the water, and of a cathodic reaction, which usually corresponds to the electrolytic precipitation of a metal on the surface of the electrode. The state of the art problem in this case lies in the fact that the system uses a common electrolyte between anode and cathode and the efficiency is subject to the chemical composition of the electrolyte used. This is reflected in high energy consumption and low efficiency of faradaic current.

The device of the invention incorporates two independent electrolytes suitably selected from an energy point of view, which enable the electrolytic transformation of ions in a controlled manner, with a high faradaic current efficiency and with a high energy performance, wherein unlike what exists nowadays greater flexibility is provided to achieve efficient responses in technological applications of electrolysis.

The device of the invention incorporates a selective and unidirectional ion exchange membrane, wherein said membrane may be cationic or anionic as appropriate.

EXAMPLES OF APPLICATION

The Multipurpose Electrolytic Device (MPED) can be applied to any forced electrolytic process in an aqueous medium in acidic environment such as sulphuric, hydrochloric or other, alkaline based on caustic soda or ammonia salts, thiocyanates or thiosulphates. In forced systems, one can cite as an example:

(a) for electrowinning of metals:
Copper case:
In the anode compartment, on the anode:

$Fe^{2+}=Fe^{3+}e^-$;

In the cathode compartment, on the cathode:

$Cu^{2+}+2e^-=Cu$.

Example in the case of zinc;
In the anode compartment, on the anode:

$Cr^{2+}=Cr^{3+}+e^-$;

In the cathode compartment, on the cathode:

$Zn^{2+}+2e^-=Zn$.

It can be applied to nickel, cadmium, cobalt, silver, gold and any metal dissolved in aqueous medium.

b) Oxide-reduction reactions: It can be used to perform forced oxide-reduction reactions that can be used to recharge flow batteries or else to oxidize or reduce ions, such as:
Reduction of Fe (III) to Fe (II):
Anodic Reaction:

$Fe^{2+}=Fe^{3+}+e^-$;

Cathodic Reaction:

$Fe^{3+}e^-=Fe^{2+}$.

In this example, it should be noted that these oxide-reduction reactions are only possible in a controlled manner with the (MPED), since the reactions described take place in separate solutions, separated by a (AIEM) that allows the selective passage of anions. In this particular case, the anodic decomposition of water could be used as the anodic reaction: $H_2O=\frac{1}{2}O_2+2H^++2e^-$, which also allows reduction of the ferric ion.

In flow batteries, for example of the $Fe^{2+}/Fe^{3+}+$ and $Cu^{2+}/Cu^+$ systems, which when used as battery $Fe^{3+}+e^-=Fe^{2+}$ and $Cu^+=Cu^{2+}+2e^-$ spontaneous reactions occur, resulting in the global reaction $Fe^{3+}+Cu^+=Fe^{2+}+Cu^{2+}$, which generates electrical energy until the chemical potentials are equalized and the battery reaches the discharge state.

When the battery is discharged, the (MPED) can be used to charge the battery which allows recharging the system according to the following reactions:
Reaction in the anodic compartment:

$Fe^{2+}=Fe^{3+}+e^-$;

Reaction in the cathodic compartment:

$Cu^{2+}+e^-=Cu^+$;

Resulting in the overall reaction:

$Fe^{2+}+Cu^{2+}=Fe^{3+}+Cu$.

Each semi-reaction takes place on the considered electrode, in the respective compartment separated by a (AIEM), in which case (even if it does not appear in the electrochemical reactions) the $SO_4^{2-}$ anion is transferred through the membrane from the cationic compartment to the anodic compartment. In this way, the flow battery is recharged.

DETAILED DESCRIPTION OF THE INVENTION

The invention discloses a multipurpose electrolytic device (MPED) for forced or spontaneous electrolytic processes incorporating selective and unidirectional ion exchange membranes for separating and allowing electrical conductivity between two or more compartments with independent electrolytes for the electrolytic transformation of ions in a controlled manner, regardless of the chemical composition of the electrolyte containing the element of interest, with high faradaic current efficiency and high energy performance.

The multipurpose electrolytic device (MPED) is intended for forced or spontaneous electrolytic processes of: electrowinning (EW) of metals, electro-oxidation (EOXI) or electro-reduction (ERED) of ionic species, using two independent electrolytes suitably selected from the energy point of view and allowing the electrolytic transformation of ions in a controlled manner, with high faradaic current efficiency and high energy performance, using selective ion exchange membranes.

The (MPED) is a solid, monolithic structure whose fabrication material is a non-electrically conductive strategic material based on polymers, cellular cement or other, of varying dimensions and structure calculated to withstand mechanical and chemical requirements specific to the application in which it is used. The (MPED) is comprised of a cationic compartment (1) electrically interconnected with an anionic compartment (2) by means of an ionic exchange membrane of the cationic type (3) (CIEM) or an ion exchange membrane of the anionic type (4) (AIEM), as appropriate. A strategic solution (SE) solution is respectively injected as a catholyte (5) or anolyte (6) in each anodic or cationic compartment, wherein said solution is determined according to the application defined, and wherein the corresponding strategic electrodes (SE) are immersed in each strategic solution (SS), whether these are cathodes (7) or anodes (8). Each strategic electrode (SE), either a cathode (7) or an anode (8), is connected to its respective bus bar (9), wherein the term strategic refers to the compatibility of the electro-chemical reaction which is defined.

In the lower part of each compartment, there is located a solution distributing pressurized tank compartment (10) and said tank is connected by one of its ends to a solution inlet pipe (11) and in the upper face of said tank there is located a perforated distribution bar (12), the perforations having an inclination angle pointing towards the surface of the cationic or anionic membrane (4), the other end of the solution distributing pressurized tank (10) being closed. The wall of the respective compartment is smaller than that of its opposite, allowing discharge of the corresponding strategic solution (SS) through an overflow tank (13), said overflow tank (13) connected to an outlet pipe (14).

The device incorporates two end containing sides (15) and contiguous perforated sides (16) attached by bolts with nut, which house and support the selective and unidirectional ion exchange membrane, as appropriate, whether of the cationic type (3) or anionic type (4).

The device (MPED) incorporates a compartment lid or seal (17) that allows controlling the pressure of the fluid contained as a strategic solution (SS), either as catholyte (5) or anolyte (6), wherein said compartment seal (17) incorporates a gas conveying pipe (18) installed in accordance with requirement of production of gases generated by the working electro-chemical reaction.

Figure 1:
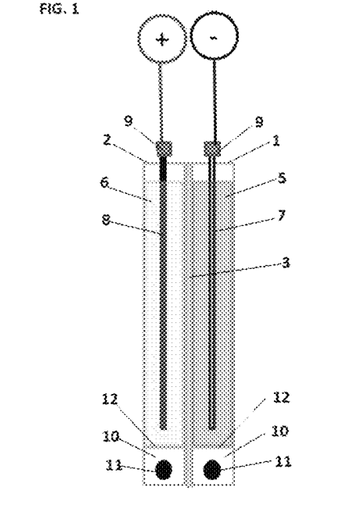
FIG. 1 shows, in a cross-section view, the basic unit that makes up the device, its inner compartments and components.

FIG. 1 shows in cross-section view the basic unit making up the device, incorporating a cationic compartment (1) and an anionic compartment (2) suitably separated by means of a selective and unidirectional ion exchange membrane which is a cationic type ion exchange membrane of (3) or an anionic type ion exchange membrane (4), as appropriate; it shows the catholyte (5) and anolyte (6) strategic solutions (SS) where the cathode (7) and anode (8) strategic electrodes (SE) are immersed, the bus bar (9), the solution distributing pressurized tank (10), a solution inlet pipe (11), a perforated distribution bar (12).

Figure 2:
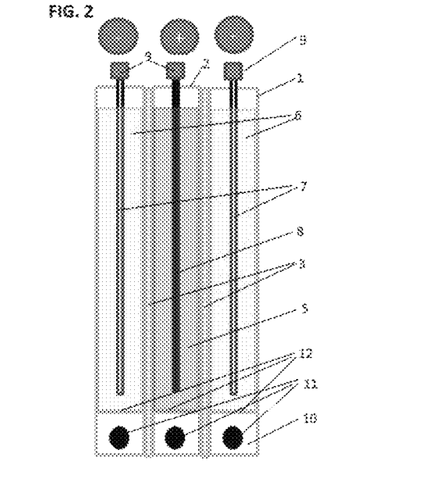
FIG. 2 shows, in a cross-section view, the basic unit of the device incorporating a second cationic compartment (1).

FIG. 2 shows in cross-section view the basic unit of the device formed by a cationic compartment (1), an anionic compartment (2) and incorporating a second cationic compartment (1), in this case the device being of the cationic type, thus incorporating two cationic type ion exchange membranes (3).

Figures 3, 4, 5:
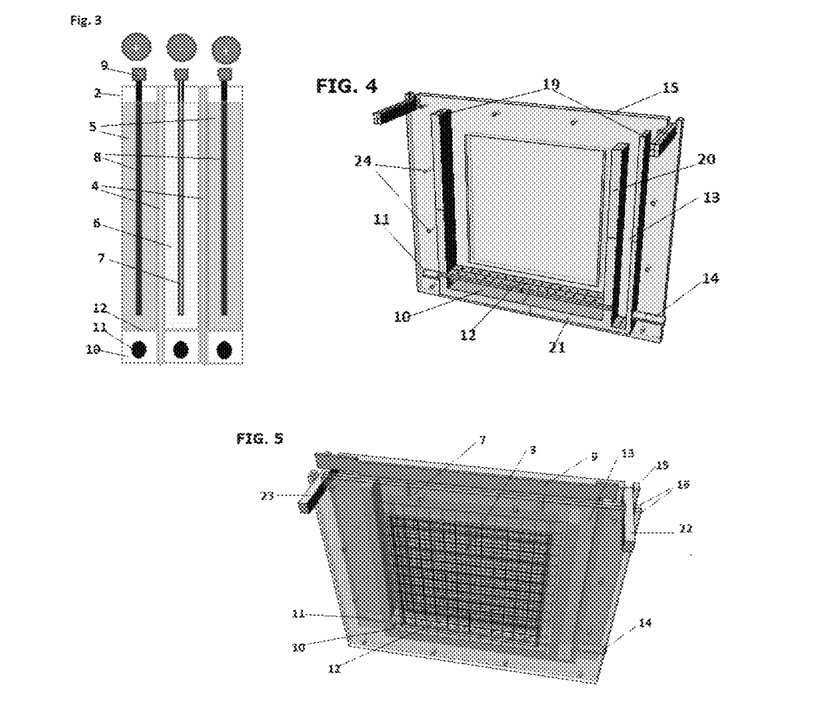
FIG. 3 shows, in a cross-section view, the basic unit of the device incorporating a second anionic compartment (2).
FIG. 4 shows, in an isometric view, the shape of an inner compartment and an end side (15) of the container.
FIG. 5 shows, in an isometric view, an inner compartment and the location of an ion exchange membrane (3).

FIG. 3 shows in cross-section view the basic unit of the device formed by an anionic compartment (2), a cationic compartment (1) and incorporating a second anionic compartment (2), in this case the device being of the anionic type and incorporating two anionic type ionic exchange membranes (4).

FIG. 4 shows in isometric view the inner compartments overlapping on an end containing side (15), a solution inlet pipe (11), an overflow tank (13), an outlet pipe (14), a solution distributing pressurized tank (10) and a perforated distribution bar (12). It indicates the arrangement of lateral sides (19) and lower horizontal sides (21) and a vertical lateral wall (20).

FIG. 5 shows in isometric view the inner compartments and a strategic cathode electrode (7), connected to the negative pole and isolated from the positive one of the bus bar (9); it shows the inner compartments incorporating a solution inlet pipe (11), an overflow tank (13), an outlet pipe (14), a solution distributing pressurized tank (10) and a perforated distribution bar or plate (12), including an end containing side (15) and two contiguous perforated sides (16) and indicates the arrangement of the positive pole (22) and the negative pole (23).

Figure 6:
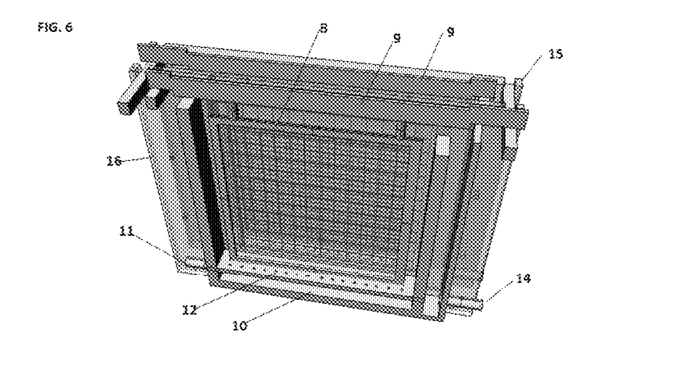
FIG. 6 shows, in an isometric view, the basic device as a whole.

FIG. 6 shows in isometric view the location of a selective ion exchange membrane which is disposed between two contiguous perforated sides (16), wherein in each of said compartments the strategic electrodes (SE) cathode (7) and anode (8) are respectively immersed; it shows how the bus bar (9) of the cathode (7) is making negative electrical contact and is electrically insulated from the positive pole and the bus bar (9) of the anode (8) is making electrical contact with the positive pole and is electrically isolated from the negative pole.

Figure 7:
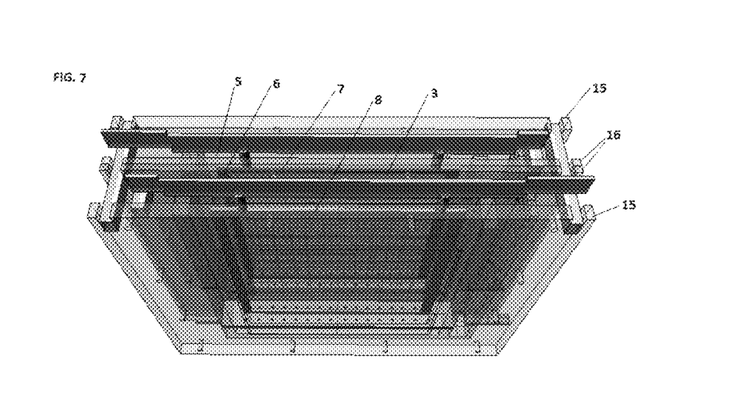
FIG. 7 shows, in an isometric view, a basic device highlighting the two compartments.

FIG. 7 shows in isometric view a basic device highlighting its two compartments, wherein one compartment is the cationic (1) one, in which the (SE) cathode (7) is immersed and the other compartment is the anionic (2) one where the (SE) anode (8) is immersed; it shows two end containing sides (15) and two contiguous perforated sides (16) which are responsible for containing the ion exchange mesh (3) or (4), as appropriate; it shows the catholyte (5) and anolyte (6) strategic solutions (SE).

Figure 8:
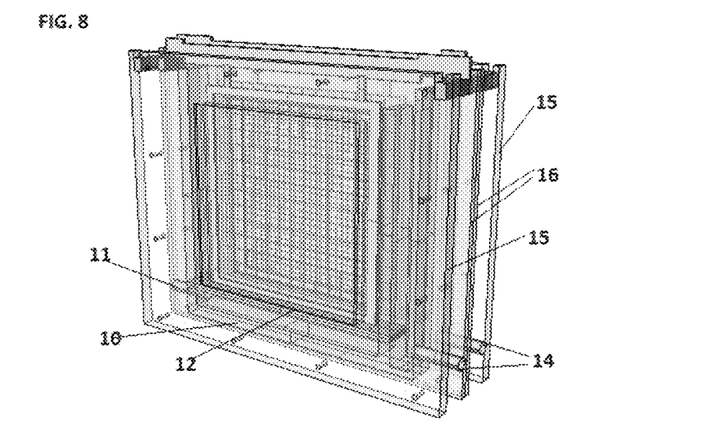
FIG. 8 shows, in isometric view, a two-compartment basic device as a whole.

FIG. 8 shows in isometric view a basic device comprised of two compartments as a monolithic assembly contained by the two end containing sides (15) and the two contiguous perforated sides (16) that contain the ion exchange membrane (3) or (4) which simultaneously separate and differentiate both compartments maintaining the electrical conductivity between both.

Figure 9:
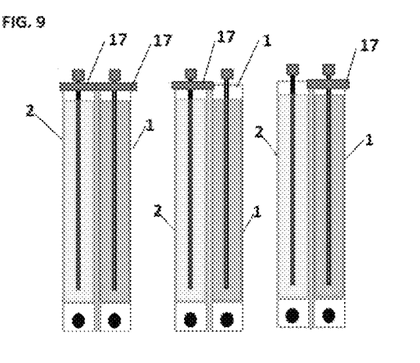
FIG. 9 shows, in an isometric view, a two-compartment basic device in which a compartment lid or seal (17) is included.

FIG. 9 shows in cross-section view a two-compartment basic device, in which a compartment lid or seal (17) is incorporated, wherein the device allows working with both compartments closed and without gases exiting, or working with the cationic compartment (1) and the anodic compartment (2) sealed, or working with the cationic compartment (1) sealed and with the anionic compartment (2) open. The seal allows working with high flows of (SS) and thermally isolate the given compartment.

Figure 10:
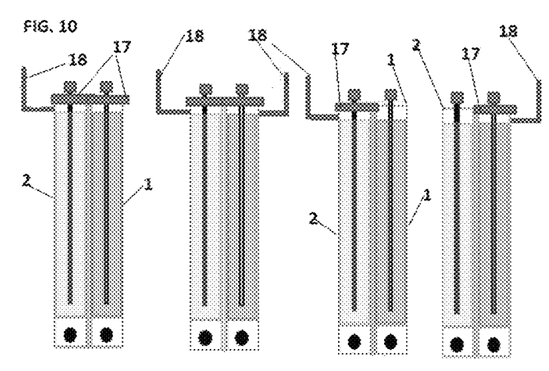
FIG. 10 shows, in a cross-section view, a two-compartment basic device in which a compartment lid or seal (17) and a gas conveying pipe (18) are included.

FIG. 10 shows in cross-section view a two-compartment basic device in which a compartment lid or seal (17) and a gas conveying pipe (18) are incorporated. In this case it is shown that the device can work in accordance to different combinations of open or closed compartment and with or without the gas conveying pipe (18).

Figure 11:
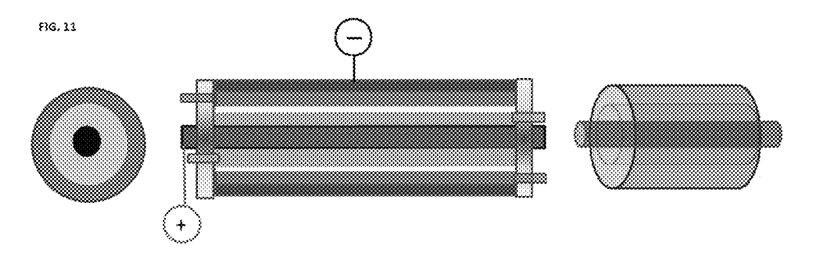
FIG. 11 shows, in an isometric view, a device of cylindrical shape.

FIG. 11 shows a multipurpose electrode device (MPED) with a cylindrical geometric shape with a concentric anode with an ion exchange membrane of the anionic type (4) (AIEM) and a conducting cathode. The multipurpose electrolytic device (MPED) allows to apply cylindrical geometry with a concentric anode with an anionic type ion exchange membrane (4) (AIEM) and with a conducting cathode. If the aqueous medium is in the sulphuric environment, $SO_4^{2-}$ is transferred from the cathodic compartment to the anodic one, across the membrane (4) (AIEM); if it is in hydrochloric medium, the transported anion is $Cl^-$. If the membrane is an ion exchange membrane of the cationic type (3) (CIEM), the transported ion is some cation, such as $Cu^{2+}$, which is transferred from the anode compartment to the cathode compartment, across the membrane (3) (CIEM). The (MPED) can use a membrane (4) (AIEM) or a membrane (3) (CIEM) which choice is based on theoretical, experimental and economic analysis for a particular application.

Manufacturing Procedure:

For the manufacture of a basic device of the invention of a two-compartment rectangular geometric shape, the following must be considered:

a) A container is manufactured with two container compartments, one anionic (2) and the other one cationic (1), using a non-electrically conductive material such as polymers, acrylic, cellular cement or other, resistant to the stresses and loads it will be subject to, wherein said compartments are formed by four walls or sides which are joined by bolts with washers and nuts inserted into perforations (24) arranged in register on each side.

b) Manufacture two end containing sides (15), one right and one left, wherein each one has inner compartments coincidentally overlapping when facing each other.

c) Fabricate two contiguous perforated inner walls or sides (16) which must include a perforation or window perfectly matching one another to accommodate between them an ion exchange membrane (3) or (4), as appropriate, which is centrally disposed between said windows.

d) The inner compartments of the two end containing sides (15) are formed with lateral sides (19) and lower horizontal sides (21), wherein each compartment, both anionic and cationic, will respectively have two lateral sides (19) and one lower horizontal side (21) and must be previously adhered to the end sides (15) of the basic unit, which acting together trap the two inner perforated sides (16) and form a watertight container with its two compartments interconnected by an ion exchange membrane (3) or (4) centrally disposed in the window formed by the inner perforated sides (16).

e) Prior to joining the assembly, a vertical side wall (20) must be incorporated into each compartment to form a overflow tank (13) and a lower horizontal perforated wall which is arranged on and separately from each lower horizontal side, for respectively the anionic and cationic compartments, wherein said wall is a perforated distribution bar or plate (12) and forms a solution distributing pressurized tank (10) in each compartment.

f) The lateral sides (19) should each include a perforation perfectly arranged in the transverse central axis of the solution distributing pressurized tank (10) of each compartment, wherein said perforation will contain an inlet pipe (11) arranged in watertight fashion for the admission of pressurized solutions to said pressurized tank.

g) The outlet pipe (14) is installed on the lateral side (19) opposite the inlet pipe (11) to discharge the fluid entering the overflow tank (13).

Operating Procedure:

For the operation of a two-compartment basic device of the invention of rectangular geometric shape, the following must be considered:

a) The anionic compartment (2) and the cationic compartment (1) are physically separated by an ion exchange membrane (3) or (4), as appropriate, but electrically connected by means of transfer of ions through said membrane.

b) The anionic compartment (2) is filled with a solution containing ions which will form an anionic half-cell and likewise the cationic compartment (1); it will contain an ionic solution which will allow the cationic half-cell reaction.

c) The device considers an external anolyte solution accumulation tank (6) and another one for the catholyte solution (5), wherein these tanks receive fresh and recirculation solution, either anolyte or catholyte, and supply the compartments of the device therefrom, maintaining the balance of solutions of the system, so that the fluid at the interior of the compartments is maintained in permanent movement.

d) The injection of the solutions into the device is performed at the bottom of each respective compartment, with a pressure that allows a homogeneous and controlled distribution on the capture surface of the membrane and the electrode;

e) The anionic (2) and the cationic (1) compartments must ideally be filled simultaneously, to avoid deformations of the membrane.

f) The discharge of the solutions is carried out by a lateral overflow, overflow tank (13) and outlet pipe (14) arranged in each compartment, in which a fraction of said solution is circulated to the external tank and the other fraction is sent to another point in the process, such as solvent extraction or leaching.

g) An anode electrode (8) is inserted in the anionic compartment (2) containing anolyte (6), which may be mesh, plate or large-volume, conducting or semiconducting, on the surface of which the anionic semi-cell reaction takes place; in turn a cathode electrode (7) is inserted into the cathode compartment (1), which can be mesh, plate or large-volume, conducting or semiconducting, on the surface of which the cationic half-cell reaction takes place.

h) If it is a forced process the polarity is defined by the rectifier which supplies the electric power and in the case when the process is not forced, the polarity is defined spontaneously.

i) For a two-compartment basic device unit, the anode electrode (8) is connected to the positive pole (22) and the cathode electrode (7) is connected to the negative pole (23).

j) For the ion exchange membrane, an initial curing step should be considered, which involves immersing the membrane completely in an ionically compatible aqueous solution compatible with the ion to be transferred.

For an industrial facility the following should be considered:

A group of devices is the combination of two or more basic device units.

An industrial facility may require several groups of devices to be electrically interconnected.

The electrical connections of a group of devices can be connected in series or in parallel, depending how it is previously established, and when more than one group of devices are required, they can also be connected to each other in series, in parallel or in series-parallel circuits.

In the case of an electro-winning or electro-refining process, a system for lifting and removing the cathodes containing the final product and for loading of new cathodes must be considered. In the specific case of electro-refining, a system for lifting and removing the cathodes containing the final product and for loading new anodes must also be considered.

The system for harvesting the cathode is similar to the current conventional electro-winning processes.

In the case of electro-refining, the system of anodes loading and removal of dregs of the cell is similar to current processes.

The ion exchange membrane requires at least one water pressure wash, once a year, on exposed surfaces.

For forced processes without solid products, the product corresponds to the electrolytic solution containing the ionic compound that has changed its oxidation state.

If the process is spontaneous, there is the generation of electrical energy, allowing its use in the production system in which it is inserted.

If the shape of the (MPED) is preferably rectangular, it can operate open or closed at the top of the anode or cathode compartments and have output or no output of gases depending on the application and can be electrically connected in series or in parallel; wherein regardless of its shape separation of the anodic compartment and the cathode compartment is considered either by an anionic type ion exchange membrane (AIEM) (4) or by a cationic type ion exchange membrane (CIEM) (3). The geometric shape of the compartments affects the hydrodynamics of the electrolytes of the (MPED) and, consequently, the diffusion phenomena, which is the natural tendency of ionic movement from high concentration areas to areas of lower concentration, which are normally in the opposite direction to the ionic movement that occurs when an electric field is activated, as in electrolytic processes. The selection of the appropriate geometry must be defined with these criteria, based on mathematical models that ensure the best response of the (MPED), wherein the main importance of achieving an optimized geometry according to these calculations enables reducing the diffusion phenomena that negatively affect the operation of the device as a whole.

Whatever the geometric shape of the (MPED) device, the anode materials to be selected must be determined with linear voltammetric tests, with an (MPED) device at laboratory scale. In this way, the anodic material turns out to be a strategic conductive or semiconductive material (SCSMA), which may be a porous, mesh-type or plate electrode. Likewise, the cathodic material turns out to be a strategic conductive or semiconductive material, which may be a porous, mesh-type or plate electrode.

The (MPED) may include electrolytes immersed in various aqueous media, such as a hydrochloric medium, wherein if a (AIEM) is used the main ion crossing the membrane is Grand if the electrolyte is in a sulphurated environment, the main ion that crosses the membrane is $SO_4^{2-}$. If a cationic type exchange membrane (3) (CIEM) is used the ion which is conveyed is a cation such as $Cu^{2+}$, $Fe^{3+}$, $Fe^{2+}$, $Na^+$ or other cations depending on the chemical composition of the electrolyte.

The number of anodic and cathodic compartments is calculated by means of Faraday's law, considering the required production of the element of interest and considering the economic technical limitations of the required rectifier.

That compartment whose conducting or semiconducting electrode is connected to the positive pole, anode, is called the anodic compartment and on its surface oxidation reactions will occur; in the same way that compartment whose conducting or semiconducting electrode is connected to the negative pole, cathode, is called cathodic compartment. The alternate arrangement of anode and cathode compartments constitute the (MPED).

The need to seal or not a certain compartment is determined according to the specific application of the (MPED) and the electrochemical reactions which are desired to be produced in a forced manner. For example, if any of the electrodes should be removed repeatedly, as in the processes of electrowinning of metals, a compartment open to the environment at the top should be considered or if any of the electrochemical reactions involved generates some kind of gas ($Cl_2$, $O_2$, $H_2$ or other) the feasibility of leaving the top of the DEMP open to the environment or with some gas conveyance system for its accumulation and subsequent use in another process, or as a by-product, has to be studied. In the best case, in which there is no significant gas production and it is not necessary to remove the electrodes, a fully sealed (MPED) may be provided.

Rectangular cells generally depend on the dimensions of commercial products, which in the case of copper are of 100 cm×100 cm, however if these pre-established definitions do not exist, the dimensions can be variable or adaptable according to the specific requirements. The compartment should allow for the loose insertion of the electrode inside the compartment, without touching the solid walls and without touching the membrane, allowing internal circulation of the fluid.

The invention claimed is:

1. Multipurpose electrolytic device (MPED) for forced or spontaneous processes of electrowinning of metals, electrooxidation (EOXI) or electroreduction (ERED) of ionic species with independent electrolytes which allows the electrolytic transformation of ions in a controlled manner, wherein the device (MPED) is a tank of solid and monolithic structure, manufactured of non-electrically conductive strategic material based on polymers, acrylic material or cellular cement and of a rectangular geometric shape; wherein the device MPED comprises two end containing sides, one right and one left, and two contiguous perforated inner sides or walls joined by bolts with washers and nuts inserted into perforations arranged in register on each inner side; wherein the MPED further comprises two inner compartments, one cationic and the other one anionic, each formed by two lateral sides and one lower horizontal side adhered to said end containing sides and coincidentally overlapping when facing each other; wherein said two inner compartments are connected by means of a selective and unidirectional ion exchange membrane centrally disposed in between a window or perforation formed in each of the inner perforated sides or walls, the membrane being either a cationic ion exchange (CIEM) membrane or anionic ion exchange (AIEM) membrane, depending on the process, wherein a strategic solution (SS) is respectively injected into each inner compartment as catholyte or anolyte and strategic electrodes corresponding to a cathode and an anode are respectively submerged into the catholyte and anolyte; wherein each electrode is connected to a respective conductive bar; wherein in the lower part of each inner compartment there is located a solution distributing pressurized tank; wherein said solution distributing pressurized tank is connected by one of its ends to a solution inlet pipe and in the upper face of said solution distributing pressurized tank there is located a perforated solution distribution bar or plate; wherein the perforations of the distribution bar or plate have an inclination angle pointing toward the surface of the ionic exchange membranes; wherein the other end of the solution distributing pressurized tank is closed; wherein each of the inner compartments comprise therein a vertical side wall which is smaller in height than that of the lateral sides of the compartment, thus forming an overflow tank opposite the solution inlet pipe for discharging strategic solution (SS); wherein said overflow tank is connected to a solution outlet pipe; wherein the MPED incorporates a compartment lid or seal for controlling the pressure of the fluid contained therein as a strategic solution (SS), either as catholyte or anolyte, wherein said compartment lid or seal incorporates a gas conveying pipe.

2. The multipurpose electrolytic device (MPED) according to claim 1, wherein the catholyte and the anolyte are different aqueous mediums.

3. The multipurpose electrolytic device (MPED) according to claim 2, wherein if an AIEM is used and the electrolyte is in hydrochloric medium, the main ion that crosses the membrane is $Cl^-$, and if the electrolyte is in a sulphurated environment, the main ion that crosses the membrane is $SO_4^-$.

4. The multipurpose electrolytic device (MPED) according to claim 2, wherein if a CIEM is used, the ion which is transported through the membrane is a cation.

5. The multipurpose electrolytic device (MPED) according to claim 4, wherein the cation is selected from $Cu^{2+}$, $Fe^{3+}$, $Fe^{2+}$ or $Na^+$.

6. A manufacturing process for a multipurpose electrolytic device (MPED) according to claim 1, wherein the process comprises manufacturing a two-compartment basic device with rectangular geometric shape following the steps of:

a) using a non-electrically conductive strategic material based on polymers, acrylic material or cellular cement to manufacture the two inner compartments, one anionic and the other cationic, wherein said compartments are formed by four walls or sides which are joined by bolts with washers and nuts inserted into perforations arranged in register on each side;

b) manufacturing the two end containing sides, one right and one left, wherein each one has said inner compartments coincidentally overlapping when facing each other;

c) fabricating the two contiguous perforated inner walls or sides with the perforations or windows perfectly matching one another to accommodate between them the ion exchange membrane, which is centrally disposed between said windows;

d) respectively adhering the two lateral sides and one lower horizontal side of the inner compartments to the end containing sides and acting together with both end containing sides with said sides of the inner compartments adhered thereto to trap the two inner perforated sides or walls and form a watertight container with the two inner compartments interconnected by the ion exchange membrane centrally disposed in the window formed on the contiguous inner perforated sides or walls;

e) prior to joining an assembly formed by the two end containing sides, the two contiguous perforated inner sides or walls and the inner compartments according to the previous step, incorporating the vertical side wall into each inner compartment to form the overflow tanks and incorporating a lower horizontal perforated wall arranged on and separately from the lower horizontal side of, respectively, the anionic and cationic compartments, wherein said wall corresponds to the perforated distribution bar or plate and forms the solution distributing pressurized tank in each inner compartment;

f) including in one of the lateral sides of the inner compartments a perforation arranged at a transverse central axis of the solution distributing pressurized tank of each inner compartment, wherein said perforation contains therethrough the solution inlet pipe-arranged in watertight fashion for the admission of pressurized solutions to said solution distributing pressurized tank; and g) installing the outlet pipe on the lateral side opposite the solution inlet pipe so as to discharge the strategic solution entering the overflow tank.

* * * * *